United States Patent
Haller et al.

[11] Patent Number: 5,906,474
[45] Date of Patent: May 25, 1999

[54] TURBINE BLADE

[75] Inventors: Brian Robert Haller, Warwickshire; David Moreton Hall, Northants; Viccars Jeremy Andrews, Warwickshire, all of United Kingdom

[73] Assignee: GEC Alsthom Limited, United Kingdom

[21] Appl. No.: 09/032,515

[22] Filed: Feb. 27, 1998

Related U.S. Application Data

[62] Division of application No. 08/918,709, Aug. 22, 1997, Pat. No. 5,779,443, which is a continuation of application No. 08/515,069, Aug. 15, 1995, abandoned.

[30] Foreign Application Priority Data

Aug. 30, 1994 [GB] United Kingdom .................... 9417406

[51] Int. Cl.$^6$ .................................................. F04D 29/44
[52] U.S. Cl. ........................................ 415/191; 415/208.1
[58] Field of Search ................................. 415/191, 208.1

[56] References Cited

U.S. PATENT DOCUMENTS

| | | | |
|---|---|---|---|
| 4,704,066 | 11/1987 | Weissbacher | 415/191 |
| 4,804,311 | 2/1989 | Anderson et al. | 415/191 |
| 5,779,443 | 7/1998 | Haller et al. | 415/191 |

FOREIGN PATENT DOCUMENTS 2161218  1/1986  United Kingdom .

*Primary Examiner*—John T Kwon
*Attorney, Agent, or Firm*—Kirschstein, et al.

[57] ABSTRACT

The invention relates to the design of a fixed-blade assembly in an axial flow steam turbine and is based on the recognition that the design of the interfacing region (fillets) between the radial ends of the blades and the end-blocks to which they are attached or of which they form a part has a significant effect on stage efficiency. The invention recognizes an optimum fillet radius in the range 0.15–0.3 of the throat dimension between the trailing edge of one blade and the suction surface of an adjacent blade, and more particularly 0.20–0.50. The fillet configuration is advantageously applied to a turbine having blades which are of constant cross-section, are curved in the radial (height) direction and are convex from root to tip on its pressure face, the result being a considerable gain in stage efficiency.

16 Claims, 5 Drawing Sheets

RADIAL VARIATION OF SETTING ANGLE
CONTROLLED FLOW VS PRISMATIC.

RADIAL VARIATION OF SIN-1(OPENING/PITCH
COMPARISON OF CONTROLLED FLOW
BLADING WITH PRISMATIC.

TURBINE BLADE

CROSS REFERENCE TO RELATED APPLICATIONS

This application is a division of U.S. patent application Ser. No. 08/918,709, filed Aug. 22, 1997, now allowed U.S. Pat. No. 5,779,443 which, in turn, is a continuation of U.S. patent application Ser. No. 08/515,369, filed Aug. 15, 1995, now abandoned.

BACKGROUND OF THE INVENTION

This invention relates to a turbine blade and to a turbine incorporating the blade. While the invention is primarily concerned with steam turbines it is also applicable to other turbines and to compressors. The term "turbine" is used in this specification to include machines of this kind having aerofoil blades. It is also primarily concerned with fixed blades in turbines but is not exclusive to them.

Turbine efficiency is of great importance, particularly in large installations where a fractional increase in efficiency can produce very large cost savings. A considerable amount of money and effort is continually expended therefore on research into the blade design, this being a critical component.

For many years the conventional blade has been of aerofoil cross-section, the (fixed) blade extending radially between inner and outer end blocks, and the blade being of prismatic form, i.e. generated by a line moving parallel to itself and intersecting an aerofoil section. The orientations of both fixed and moving blades about their respective blade axes has also been standardised for this prismatic blade design, this orientation being defined by the blade stagger angle between the turbine axial direction and a line tangential to the blade leading edge and trailing edge circles on the pressure face of the aerofoil blade.

A known improvement in the performance of the prismatic blade in the turbine is achieved by imposing a 'lean' on the blade, i.e. tilting it about its root in a circumferential plane i.e. one transverse, or perpendicular, to the turbine axis. This 'lean' produces a variation in the mass flow at outlet of the blade from the root to the tip. The radially inner and outer ends of the blade are referred to as the root and the tip despite the fact that both root and 'tip' are terminated by the end walls of the supporting rings 21 and 22 shown in the accompanying FIG. 1.

Since the circumferential spacing of the blades (ie pitch) increases progressively from the root to tip, the position where the throat line intersects the suction surface moves upstream with increased radius. Owing to the convex curvature of the suction surface this leads to an increase in the outlet angle from about 13° at the root (relative to the tangential direction) to about 15° at the tip. This is illustrated in the accompanying FIG. 6.

The blade outlet angle $\alpha$ is illustrated in FIGS. 3(a) and 3(b) of the accompanying drawings and is defined as $\sin^{-1}$ (throat/blade pitch).

From the same figures the following parameters appear. The throat is the shortest width in the blade passages. It normally extends from the pressure surface of a blade at the trailing edge and is orthogonal to the suction surface of the adjacent blade.

The stagger angle is the angle between the axis of the turbine and the tangent line touching the leading and trailing circles of the aerofoil section.

The blade chord length is the overall extent of the blade along the stagger angle tangent line.

Modifications to the basic prismatic blade design have in the past been proposed. For example, in the Hitachi Review Vol 27, No. 3 of 1978, twisted and other blade forms were proposed. In what was referred to as the 'controlled vortex nozzle design' there was described a nozzle (i.e. fixed blade) which conformed to the conventional prismatic blade form for the lower half of its radial height but which had a progressively finer setting angle for the upper half. The setting angle is the angle by which the aerofoil section at any blade height is rotated within its own plane from the normal disposition for a prismatic blade. A fine setting indicates a rotation of the aerofoil section to reduce the throat and thus reduce the outlet angle and a coarse setting a rotation to increase it. FIG. 3 of this earlier article illustrates a continuous rotation of the blade section from the root to the tip, the setting angle becoming finer with increased blade height.

Despite the fairly comprehensive analysis of blade design and setting angle of this earlier study it has been found that none of the designs investigated achieve the degree of improvement that the present invention provides.

Thus, it is an object of the present invention to provide a blade design which provides a significant improvement in performance over previously known designs.

SUMMARY OF THE INVENTION

According to the present invention, there is provided a turbine having a ring of aerofoil blades mounted between inner and outer end-blocks, the working fluid path between adjacent blades being closed in cross-section by the end walls formed by said end-blocks, wherein the blades and their associated end-blocks are formed integrally and machined to provide fillets between the blade aerofoil surfaces and the end walls, said fillets having a radius in the range 0.15 to 0.3 of a throat dimension between adjacent blades.

The throat dimension may be that between either the root or the tip of adjacent blades, according to where the fillets are located, or alternatively a mean-value throat dimension may be used instead, in which case there is an advantage of greater ease of manufacture, since all the fillets are the same, but a disadvantage of reduced gains in efficiency. This mean value is preferably taken as the mean value of the throat dimensions between adjacent blades taken at the root and the tip of the blades. The fillet radius more preferably lies in the range 0.2 to 0.25 of the value of throat dimension used, and in particular approximately 0.23 of that value.

The above-described fillet configuration may be advantageously employed in a turbine having a plurality of blades arranged in the annular path of a turbine working fluid, each blade being of at least approximately constant aerofoil cross-section from its root at the radially inner end to its tip at the radially outer end, and being substantially symmetrically curved between the root and the tip so that the pressure face of the aerofoil blade is convex in the radial direction between root and tip. The simultaneous use of such a blade with the described fillets can result in high stage efficiency.

BRIEF DESCRIPTION OF THE DRAWINGS

A turbine blade in accordance with the invention, and its incorporation in a steam turbine, will now be described, by way of example, with reference to the accompanying drawings, in which.

DESCRIPTION OF THE PREFERRED EMBODIMENT

Figure 1:
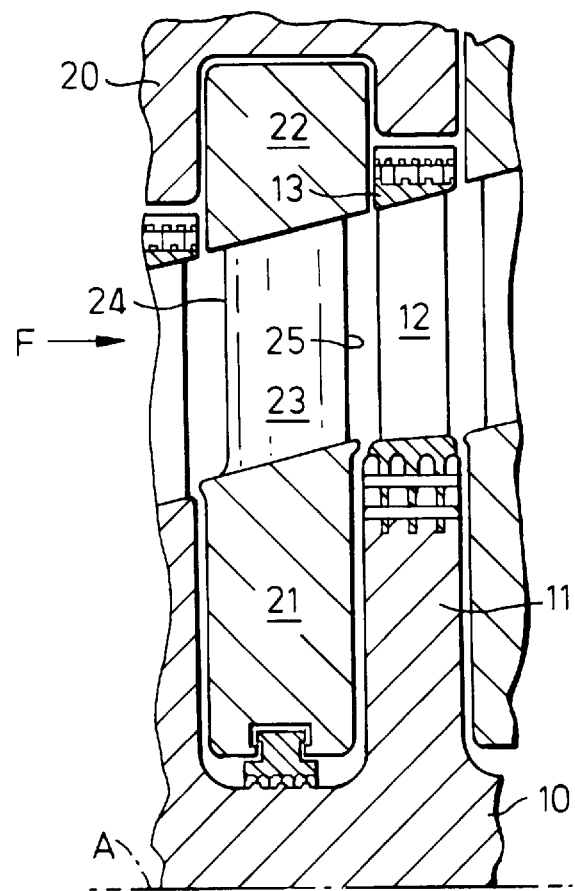
FIG. 1 is a diagrammatic sectional view on the axis of a steam turbine showing a conventional 'disc and diaphragm' high/intermediate pressure steam turbine stage including an assembly of fixed blades.

Referring now to the drawings, there is shown in FIG. 1 a diagrammatic axial section view of a conventional 'disc and diaphragm' high/intermediate pressure steam turbine stage. The direction of flow F of the working fluid, steam, is approximately parallel to the turbine rotor axis A. The rotor 10 has, for each stage, a disc 11 to which is secured a set or row of circumferentially aligned and spaced apart moving blades 12, the blades 12 having a shroud 13 attached to their radially outer ends. Energy in the steam flowing in the direction F from the front to the rear of the turbine is converted into mechanical energy in the rotor 12. For each stage, a fixed blade assembly precedes the set of moving blades 12 and is secured to the turbine inner casing 20. This fixed blade assembly comprises a radially inner ring 21, a radially outer ring 22 and a row of circumferentially aligned and spaced apart fixed blades 23, each blade 23 being secured at an inner end to the inner ring 21 and at an outer end to the outer ring 22, and each blade having a leading edge 24 facing the flow and a trailing edge 25. The assembly of blades 23 with the inner and outer rings 21, 22 is known as a diaphragm. The disc and diaphragm stage as shown in FIG. 1 is of the type in which the area between the inner and outer rings 21, 22 orthogonal to the turbine axis A is larger at the fixed blade trailing edges 25 than at the blade leading edges 24. Furthermore, in the example shown in FIG. 1, the surfaces, i.e. the end walls, of the rings (or end blocks) 21, 22 to which the blades 23 are secured have a frusto-conical shape diverging from the turbine axis A in the direction F from the leading (24) to the trailing (25) edges of the blades 23.

Figure 2:
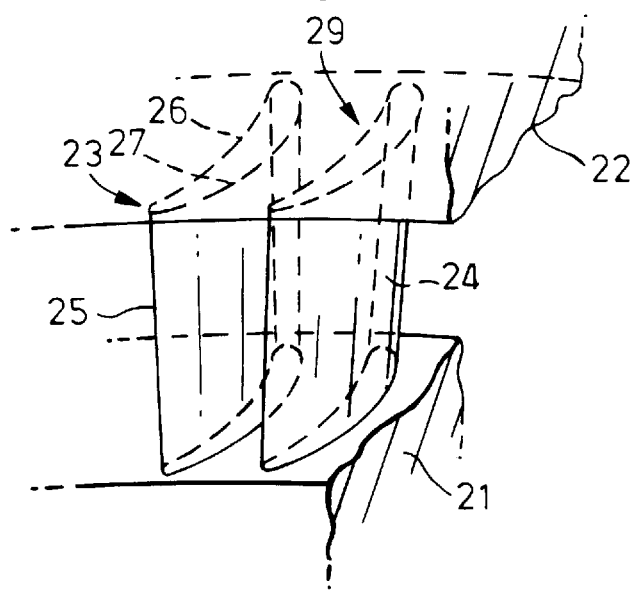
FIG. 2 is a perspective view of two such conventional blades in the fixed blade diaphragm.

Referring now to FIG. 2, there is shown a rear view of part of a fixed blade assembly which is of the type shown in FIG. 1. The fixed blades 23 shown in FIG. 2 are of the conventional prismatic kind, that is, they are each straight, i.e. designed such that the notional aerofoil sections of the blade, each considered orthogonal to a radial line from the turbine axis, have the same shape from the blade inner end to the blade outer end are untwisted from the root end to the tip end and are stacked with the leading edge 24 and the trailing edge 25 each on a straight line. Each blade 23 has a concave pressure side 26 and a convex suction side 27.

Figure 3A:
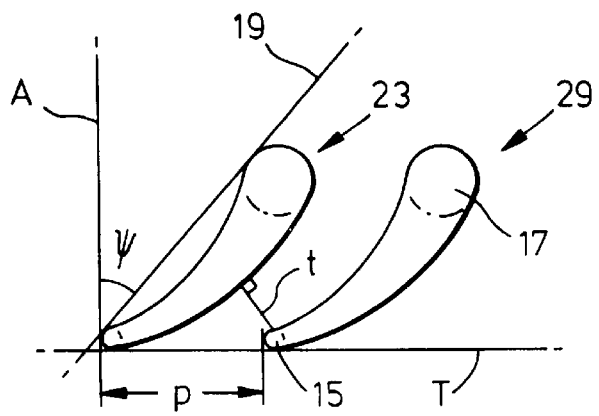
FIG. 3(a) is a diagrammatic radial view of the blades of FIG. 2.
Figure 3B:
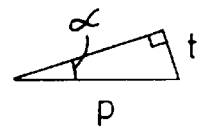
FIG. 3(b) is a diagram illustrating the outlet angle from the fixed blades.

Referring to FIG. 3(a) this illustrates, in a radial plan view, the orientation of the fixed blades 23 and 29 relative to the turbine axis A and the transverse (ie tangential or circumferential) plane T containing the fixed blade ring and to which the axis A is perpendicular. The blade aerofoil section is based on a small trailing edge circle 15 and a larger leading edge circle 17. The tangent line 19 to these two circles is at an angle ψ, the stagger angle, from the axis A direction.

If a perpendicular line is drawn from the suction face 27 of blade 23 to meet the pressure face 26 of the adjacent blade 29, and then if the shortest such line is taken, this is the throat dimension t, which occurs in the region of the trailing edge 25 of the blade 29. The ratio of this dimension t to the pitch p of the fixed blades gives the sine of what is known as the outlet angle α. It may be seen that, approximately, this angle is the outlet angle from each blade relative to the transverse plane T.

Figure 4:
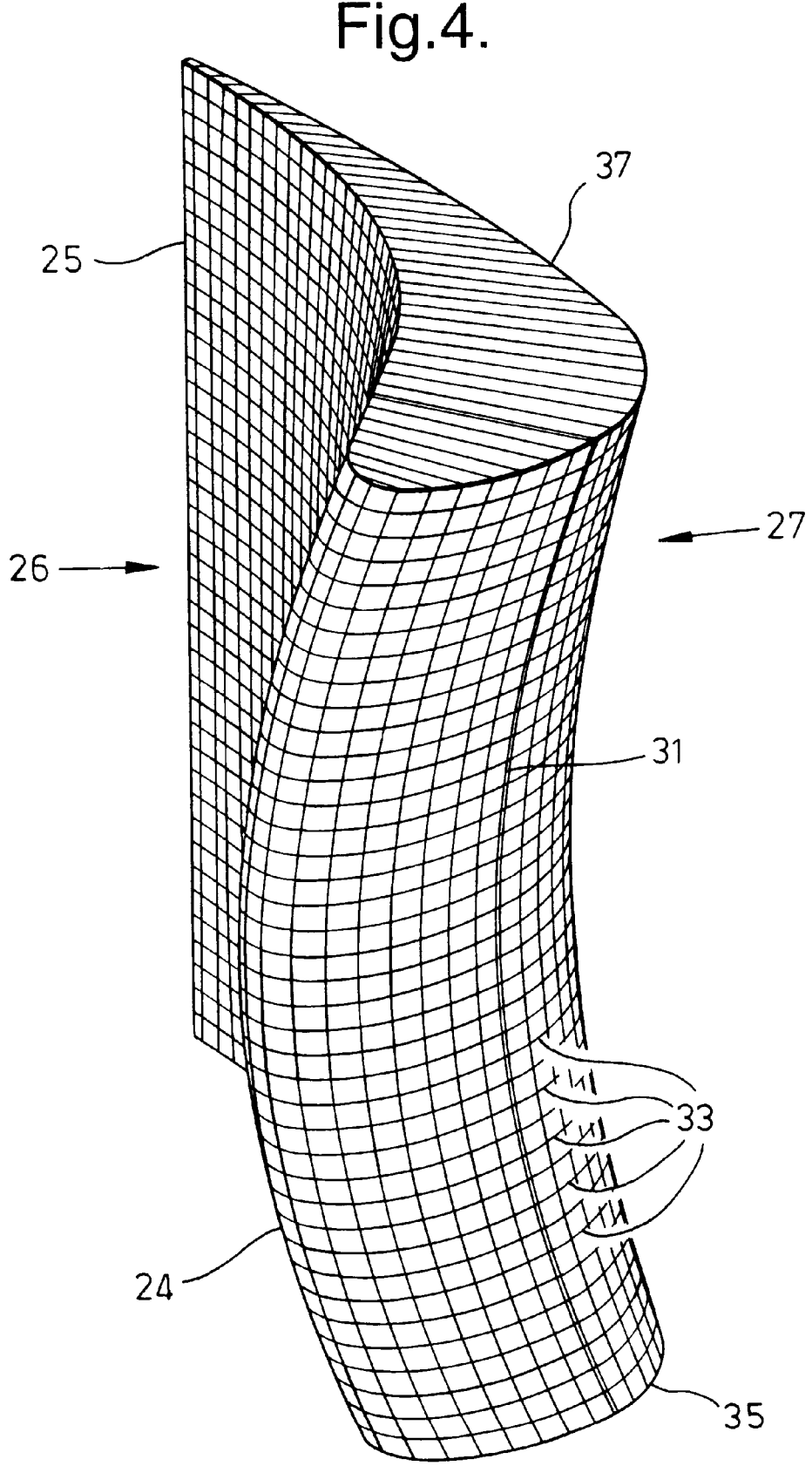
FIG. 4 is a perspective view of a fixed blade according to the invention. The grid pattern shown on the surface is not of course present in reality but serves to emphasize the curved formation of the blade.

FIG. 4 shows a blade which is shaped in accordance with the principles of the invention. It has a straight trailing edge 25 like the conventional prismatic blade but the remainder of the blade, and in particular the leading edge 24, is not straight but is curved in a manner such that the pressure face of the blade is convex in the radial direction between root and tip, that is, in a plane which is transverse to the general steam flow direction between the blades. One such plane 31 is indicated in FIG. 4, the convex curvature in this plane on the pressure face 26 being obscured but conforming to that at the leading edge 24.

Figure 5:
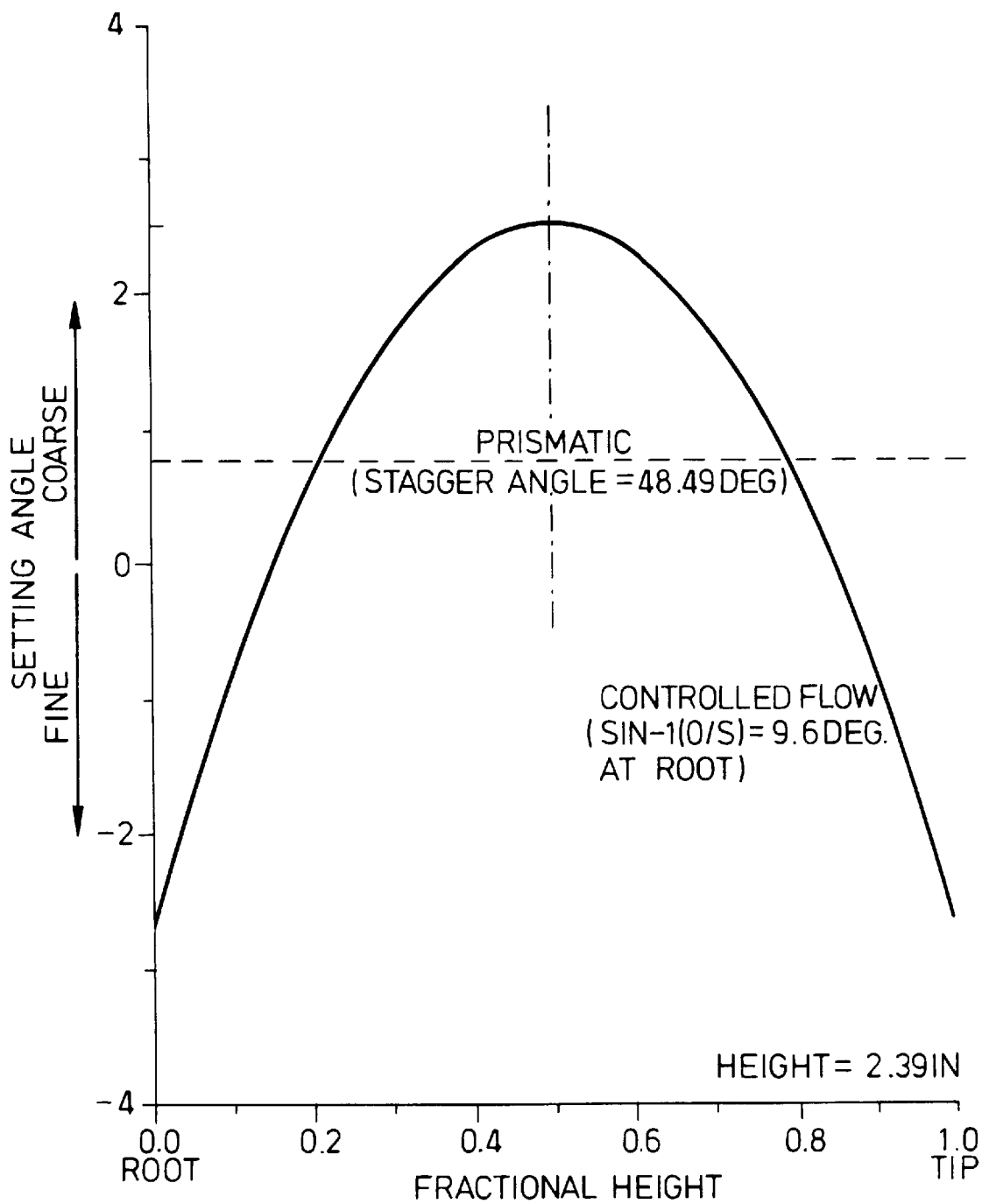
FIG. 5 is a graph of blade section setting angle against height of the section from root to tip of the blade, for conventional prismatic blade and blade according to the invention.

More specifically this curvature is illustrated in FIG. 5 by the change in the setting angle of the various aerofoil sections 33 of FIG. 4 from the root 35 to the tip 37 of the blade. The individual aerofoil sections 33 may be considered as being rotated in their own planes about the trailing edge 25 by a setting angle which is positive in the central part of the radial height, and negative in the root and tip portions. 'Positive' is taken to be a rotation toward the pressure face 26 and negative toward the suction face 27.

In the particular example of FIG. 5, a zero setting angle occurs at about one-fifth and four-fifths of the radial blade height where the aerofoil section has the same stagger angle, i.e. the same orientation relative to the turbine axis, as a conventional prismatic blade in an otherwise similar conventional turbine. This 'conventional' stagger angle is assumed to be 48.5°.

The setting angle varies from about minus 2.5° at the root and tip to plus 2.5° at the centre of the radial height. This is a preferred arrangement where the conventional, i.e. reference, stagger angle is 48.5°. However, variations in the setting angle 5° difference will still produce efficiency benefits if only to a lesser extent. It is envisaged that a variation of ±2° on the 5° difference will still be beneficial, i.e. a range of setting angle differences from 3° between root/tip and centre height, to 7° between root/tip and centre height. It is preferred however to limit the variation to ±1° i.e. differences from 4° to 6°.

The variation of setting angle throughout the height of the blade is preferably parabolic, as illustrated in FIG. 5.

It would to some extent be acceptable to skew the aerofoil sections about some other axis than the trailing edge 25, for example the leading edge 24 or some intermediate axis. However, the choice of the trailing edge as the rotation axis has several advantages. It keeps the critical interspace gap between the fixed and downstream moving blades constant. This gap has an important influence upon the unsteady aerodynamic forces on the moving blade and also on the stage efficiency via boundary layer growth on the end walls. Secondly, by building the curvature largely into the leading edge a "compound lean" effect is incorporated into the leading edge area of the blade where secondary flows are generated. These secondary flows comprise vortices in parallel with the main flow the vortices being near the end walls between adjacent fixed blades. By the use of the compound curved blade of the invention, over the inner (i.e. lower) half of the blade height the pressure surface points radially inwards, and over the outer half of the blade height the pressure surface points radially outwards. The body forces exerted on the flow are counteracted by higher static pressures on the end walls. This results in lower velocities near the end walls and hence lower frictional losses.

Figure 6:
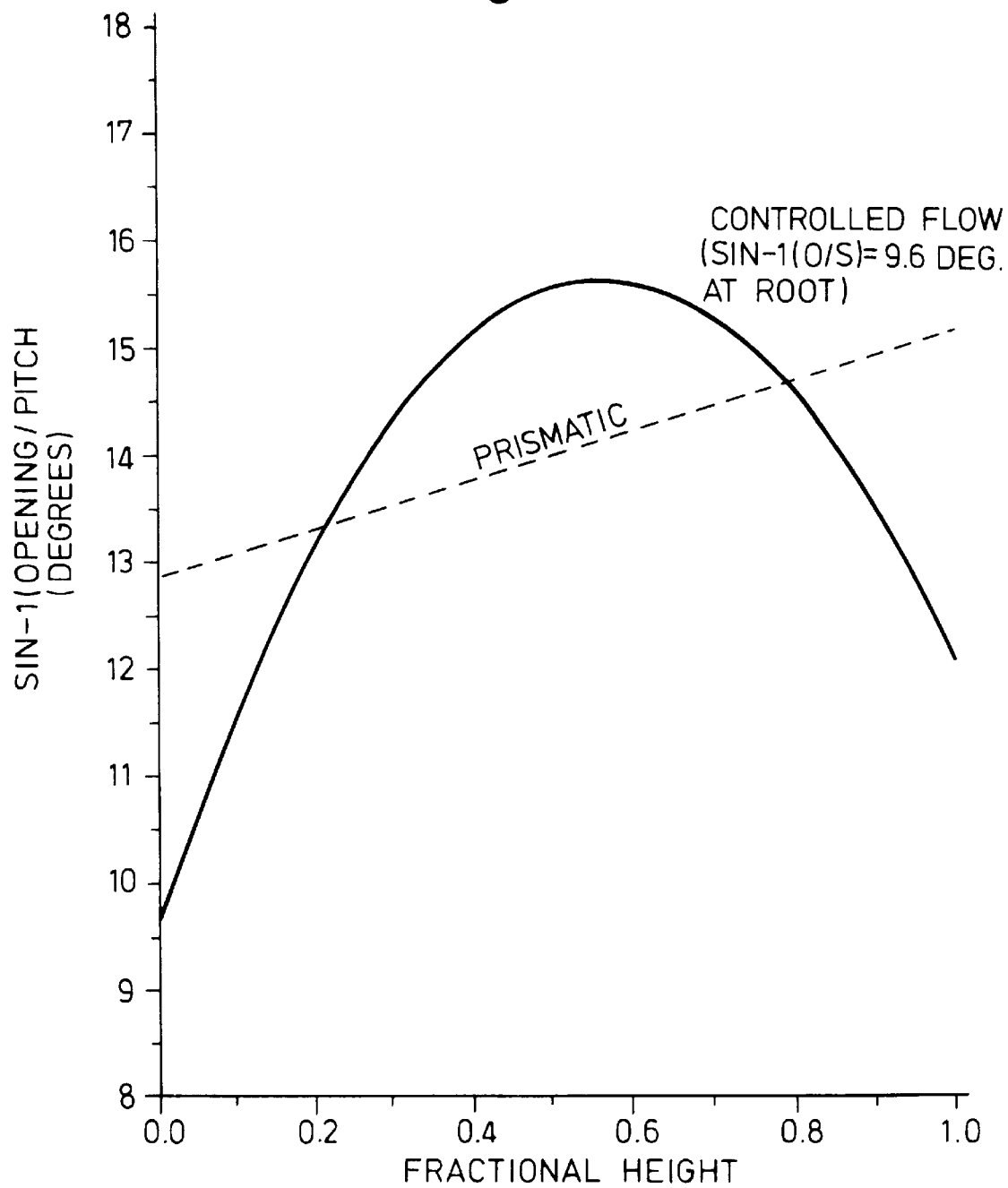
FIG. 6 is a graph of blade outlet angle against section height, again for the two types of blade.

Referring now to FIG. 6, this illustrates the relation between outlet angle α and radial height of the blade section (33 in FIG. 4).

In the conventional, prismatic, case, the outlet angle increases almost linearly from about 13° at the blade root to about 15° at the tip. This increase in the opening corresponds simply to the increase in the blade pitch with increasing radius. In a turbine stage incorporating the fixed blade of this embodiment, and having a form defined by the setting angle graph of FIG. 5, the outlet angle varies from about 9.6° at the root to about 15.6° at the mid-height and back to 12° at the tip. This asymmetry similarly derives from the increase in the blade pitch with radius since the throat moves upstream (on the suction surface) with increase of pitch and since the throat increases faster than the pitch the outlet angle increases with pitch and therefore with radius. This difference of outlet angle between tip and root is despite the setting angle being the same at tip and root.

The effect of the curved blade according to the invention is to reduce the flow through both of the high loss regions near the root and tip end walls and increase the flow through the more efficient mid-height region.

The best prismatic design of which the Applicants are aware is one having a straight negative lean of 8°, i.e., in which the fixed blades lean in the transverse plane in a direction toward the suction face at an angle of 8° to the radius through their root. The curved blade of the present invention when tested in a two-stage air turbine has shown an efficiency gain of 0.8% compared to this "best" conventional design.

It is thought that a benefit arises not only in the fixed blade row but also in the downstream moving blade row, as lower mass flows are passed into the end wall regions where there are high secondary losses.

Where the inventive concept is applied to a series of stages in a complete high pressure or intermediate pressure cylinder, where the blade height increases as the steam density decreases, the following technique is used:

(a) the outlet angle of the blade section at the root is maintained at about 9° throughout the stages;
(b) the same setting angle is used at the tip as for the root, i.e. the blade is symmetrical about the mid-height;
(c) the setting angle at the mid-height section is chosen to keep the mean throat (over the blade height) the same as for a prismatic blade in the same stage. This keeps the stage reaction at the same level as for the corresponding conventional design.
(d) a parabolic distribution of setting angle over the blade height is used as for the basic design.

It may be seen that for a series of stages the blade form is simply stretched radially according to the height of the stage blade.

While the invention has been described in relation to the use of 'short height' HP/IP fixed blades in a steam turbine of the low reaction disc and diaphragm type, it is also applicable to other types of axial flow turbine and compressor, and to moving as well as fixed blades.

A further feature of the invention concerns the construction of fixed blades between their end blocks. The blades are machined or cast in groups integrally with their end blocks which are sections of the rings 21 and 22 (FIGS. 1 and 2). The blade units are then machined to provide the necessary accurate dimensioning and surface finish.

Figure 7:
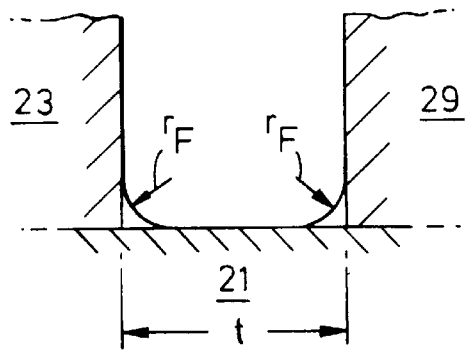
FIG. 7 is a partial cross-section of the throat passage between two blades showing the fillets formed between the two blades and the end block.

FIG. 7 is a diagram of a cross-section of part of the throat passage between two fixed blades. It has been found that the radius of the fillet between the end blocks 21 and 22 has a significant effect on the stage efficiency. The optimum fillet radius has been found to be in the range 0.15 to 0.3 of the throat dimension, with a preferred part of this range being 0.2 to 0.25 and, in particular, 0.23.

Clearly, since the throat opening at the tip is different from that at the root (due to the increase of pitch with radius), the optimum fillet radius at the outer end block will be different from that at the inner end block. Thus, the preferred, optimum values of radius are:

$$r_{Fillet,\ root} = 0.233 \times opening_{root}$$

$$r_{Fillet,\ tip} = 0.233 \times opening_{tip}$$

However, the use of two different values of radius requires the use of different cutting tools during the manufacturing process, and it is possible to compromise by having just one radius value which is an average of the above values, i.e.:

$$r_{Fillet} = 0.233 \times \left( \frac{opening_{root} + opening_{tip}}{2} \right)$$

Tests in a two-stage air turbine using the above "average" fillet radius in conjunction with the described "controlled flow" blade design show a stage efficiency gain of around 1.2% relative to the best conventional design with prismatic fixed blades (set with −5° straight "lean" of the trailing edges).

Figure 8A:
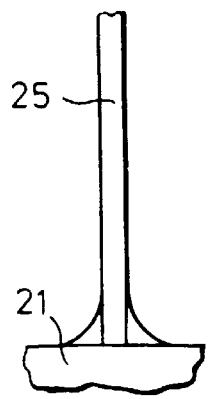
FIG. 8 is a diagram showing a trailing blade edge with a conventional fillet and one with a "faired-out" fillet.
Figure 8B:
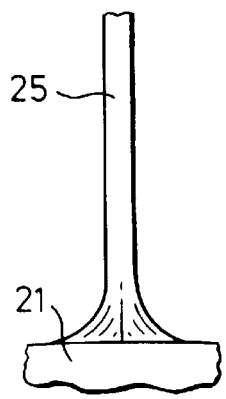
Figure 8C:
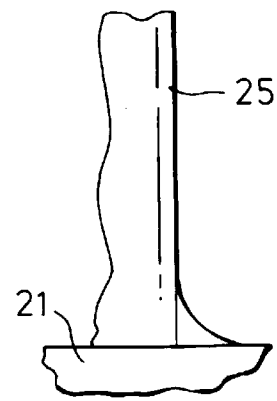

It is also advantageous, in order to reduce blockage effects, to "fair out" the fillet downstream of the trailing edge of the blade. This is shown in FIG. 8, where FIG. 8a represents an end view of a trailing edge 25 with a conventional fillet between the edge 25 and the end wall 21, and FIG. 8b represents the same view but with a "faired-out" fillet. A partial side view of FIG. 8b is shown in FIG. 8c, where the fillet can be clearly seen to disappear to zero at its most downstream point from the trailing edge.

We claim:

1. A turbine having a ring of aerofoil blades mounted between inner and outer end blocks the working fluid path between adjacent blades being closed in cross-section by the end walls formed by said end blocks, wherein the blades and their associated end blocks are formed integrally and machined to provide fillets between the blade aerofoil surfaces and the end walls, said fillets having a radius in the range 0.15 to 0.3 of a throat dimension between adjacent blades.

2. A turbine according to claim 1, wherein said fillets have a radius in the range 0.15 to 0.3 of a mean value of the throat dimensions between adjacent blades taken at the root and the tip of the blades.

3. A turbine according to claim 1, wherein said fillets have a radius in the range 0.15 to 0.3 of a throat dimension between adjacent blades taken at the respective root or tip of the blades.

4. A turbine according to claim 2, wherein a multiplying factor of the fillet radius lies in the range 0.2 to 0.25.

5. A turbine according to claim 2, wherein a multiplying factor of the fillet radius is approximately 0.23.

6. A turbine according to claim 3, wherein a multiplying factor of the fillet radius lies in the range 0.2 to 0.25.

7. A turbine according to claim 3, wherein a multiplying factor of the fillet radius is approximately 0.23.

8. A turbine according to claim 1, wherein said fillets are extended behind respective trailing edges of said blades, the fillets in this region being of concave form and merging into their respective end walls at a point downstream of said respective trailing edges.

9. A turbine including at least one stage having a plurality of turbine blades arranged in an annular path of a turbine working fluid, each of said blades being of at least approximately constant aerofoil cross-section from a root at the radially inner end to a tip at a radially outer end of the respective blade, and the blade being substantially symmetrically curved between the root and the tip so that a pressure face of the aerofoil blade is convex in the radial direction between root and tip, wherein said blades are mounted between inner and outer end-blocks and the working fluid path between adjacent blades is closed in cross-section by the end walls formed by said end blocks, the blades and their associated end-blocks being formed integrally and machined to provide fillets between the blade aerofoil surfaces and the end walls, said fillets having a radius in the range 0.15 to 0.3 of a throat dimension between adjacent blades.

10. A turbine according to claim 9, wherein said fillets have a radius in the range 0.15 to 0.3 of a mean value of the throat dimensions between adjacent blades taken at the root and the tip of the blades.

11. A turbine according to claim 9, wherein said fillets have a radius in the range 0.15 to 0.3 of a throat dimension between adjacent blades taken at the respective root or tip of the blades.

12. A turbine according to claim 10, wherein a multiplying factor of the fillet radius lies in the range 0.2 to 0.25.

13. A turbine according to claim 10, wherein a multiplying factor of the fillet radius is approximately 0.23.

14. A turbine according to claim 11, wherein a multiplying factor of the fillet radius lies in the range 0.2 to 0.25.

15. A turbine according to claim 11, wherein a multiplying factor of the fillet radius is approximately 0.23.

16. A turbine according to claim 9, wherein said fillets are extended behind respective trailing edges of said blades, the fillets in this region being of concave form and merging into their respective end walls at a point downstream of said respective trailing edges.

* * * * *